(12) United States Patent
Amano

(10) Patent No.: US 7,990,621 B2
(45) Date of Patent: Aug. 2, 2011

(54) PROJECTION LENS AND PROJECTION DISPLAY DEVICE USING THE SAME

(75) Inventor: Masaru Amano, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 35 days.

(21) Appl. No.: 12/508,896

(22) Filed: Jul. 24, 2009

(65) Prior Publication Data

US 2010/0053773 A1 Mar. 4, 2010

(30) Foreign Application Priority Data

Aug. 27, 2008 (JP) ................ P2008-218204

(51) Int. Cl.
*G02B 9/04* (2006.01)
*G02B 15/14* (2006.01)

(52) U.S. Cl. .............. 359/651; 359/793; 359/691

(58) Field of Classification Search ......... 359/649–651, 359/680–682, 686, 689, 691, 749–756, 761, 359/763, 771, 781–784, 793
See application file for complete search history.

(56) References Cited

U.S. PATENT DOCUMENTS

| | | | |
|---|---|---|---|
| 6,317,269 B1 | 11/2001 | Yamamoto | |
| 6,496,310 B2 * | 12/2002 | Fujimoto | 359/680 |
| 7,079,324 B2 * | 7/2006 | Yamasaki | 359/680 |
| 7,212,349 B2 * | 5/2007 | Mitsuki | 359/682 |
| 2009/0109543 A1 * | 4/2009 | Nagatoshi | 359/663 |

FOREIGN PATENT DOCUMENTS

JP 2001-166205 A 6/2001

OTHER PUBLICATIONS

"Ohara Inc. : S-FPL." OHARA. Web. 08 Oct. 2010. <http://www.ohara-inc.co.jp/en/product/optical/list/s-fpl.html>.*

* cited by examiner

*Primary Examiner* — Darryl J Collins
*Assistant Examiner* — Zachary Wilkes
(74) *Attorney, Agent, or Firm* — Birch, Stewart, Kolasch & Birch, LLP

(57) ABSTRACT

Disclosed are a projection lens that has a simple inner focus structure, an appropriate back focal length, telecentricity, a high optical performance, and a small size and can effectively correct, particularly, lateral chromatic aberration, and a projection display device. A projection lens includes a first lens group having a negative refractive power and a second lens group having a positive refractive power arranged in this order from a magnification side. A fifth lens arranged closest to a reduction side in the first lens group is moved along an optical axis to adjust focus, and at least two lenses are made of a material with anomalous dispersion capable of reducing chromatic aberration in a wide visible range.

7 Claims, 5 Drawing Sheets

EXAMPLE 1

EXAMPLE 1

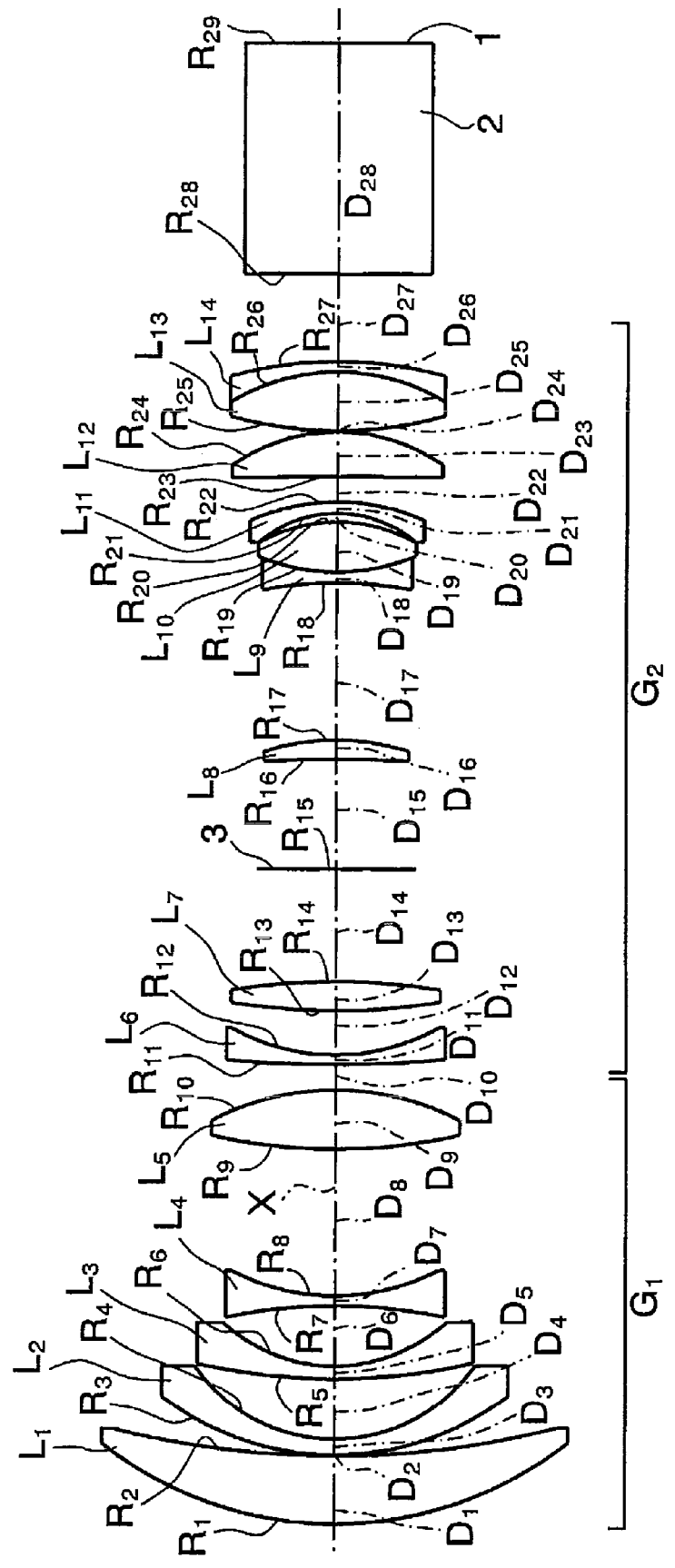
FIG.2 EXAMPLE 2

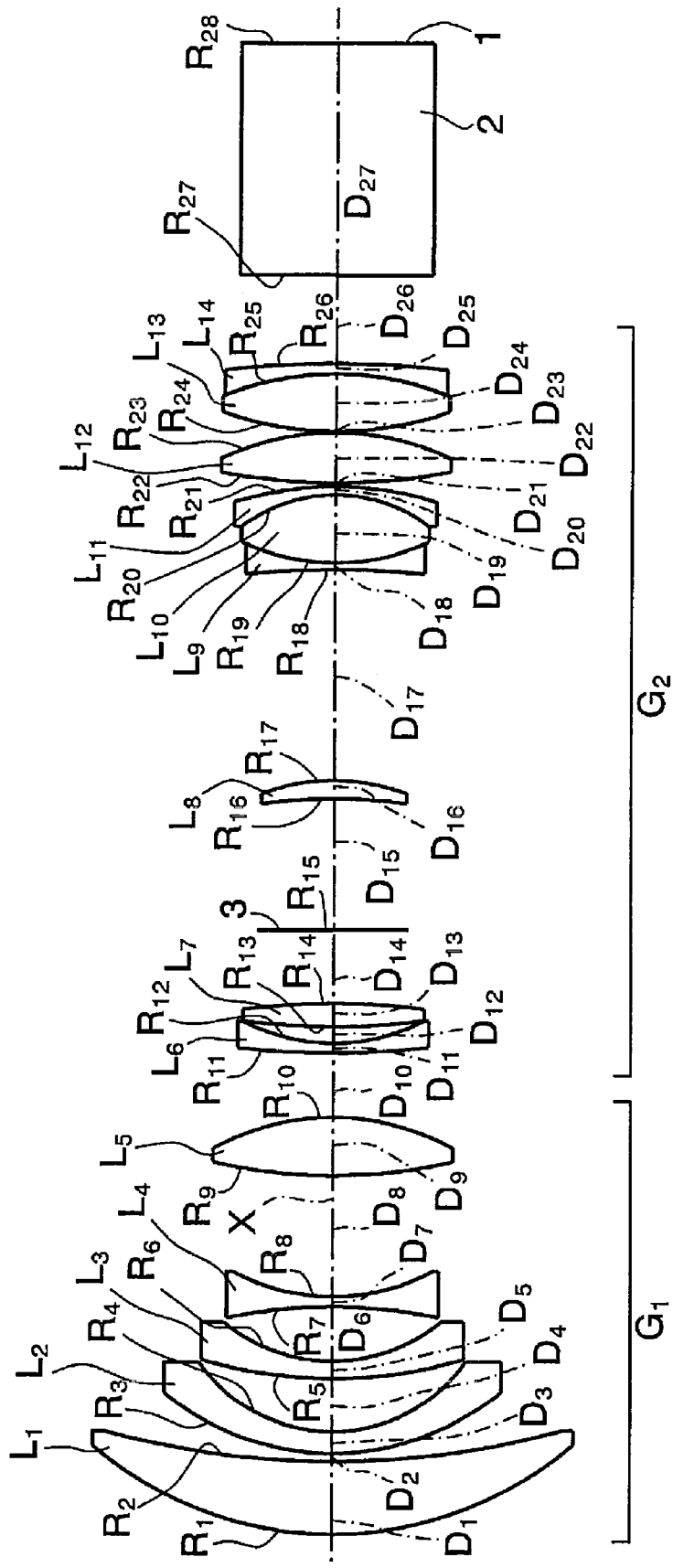

FIG.4　　EXAMPLE 1
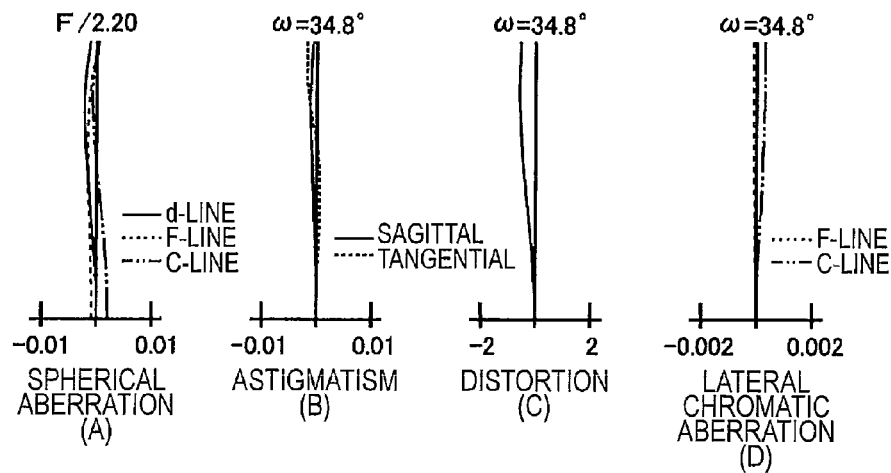
FIG.5　　EXAMPLE 2
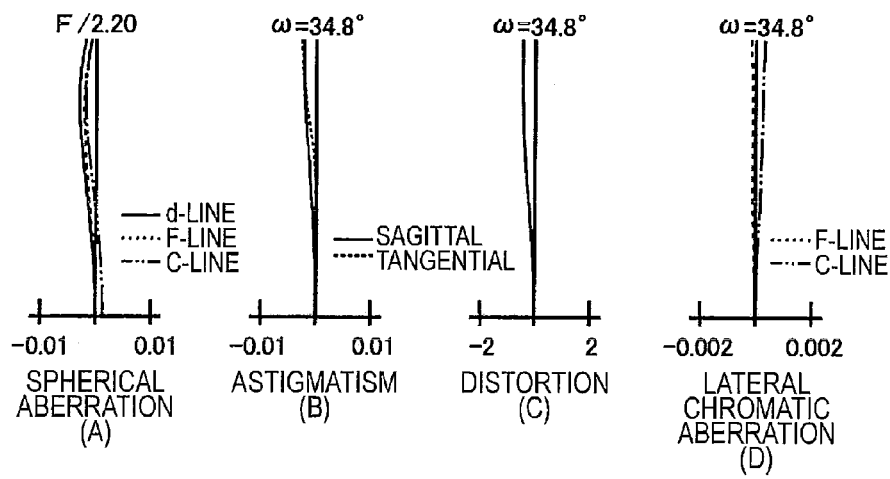
FIG.6　　EXAMPLE 3
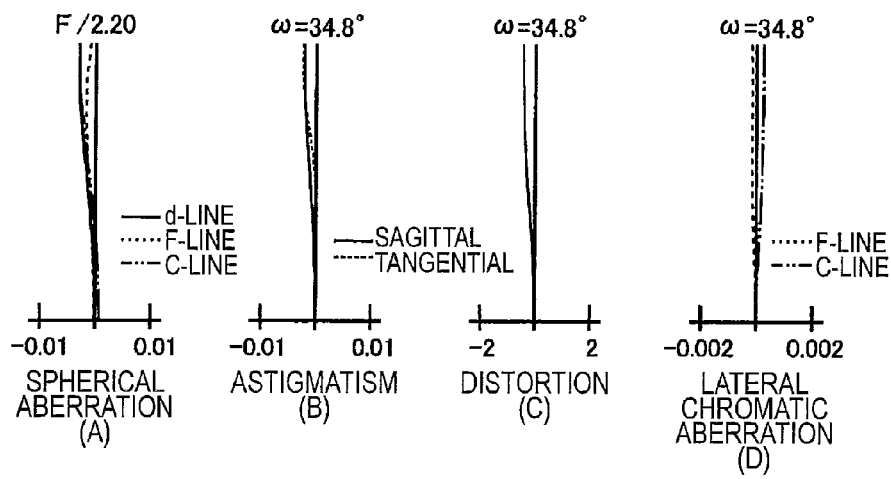

PROJECTION LENS AND PROJECTION DISPLAY DEVICE USING THE SAME

CROSS-REFERENCE TO RELATED APPLICATIONS

This application is based upon and claims the benefit of priority from Japanese Patent Application No. 2008-218204 filed on Aug. 27, 2008; the entire contents of which are incorporated herein by reference.

BACKGROUND OF THE INVENTION

1. Field of the Invention

The present invention relates to a projection lens that enlarges and projects, for example, display information from a light valve, such as a transmissive or reflective liquid crystal display device or a DMD (digital micro-mirror device), and more particularly, to a projection lens applicable for a so-called front projection display device, and a projection display device using the same.

2. Description of the Related Art

In recent years, projection display devices using light valves, such as a liquid crystal display device or a DMD display device, have come into widespread use. In particular, a projection display device has been widely used which uses three light valves corresponding to illumination light components of three primary colors, such as R, G, and B, to modulate the illumination light components, combines the light components modulated by the three light valves using, for example, a prism, and displays an image on a screen using a projection lens.

In the projection display device that uses a color composition optical system to compose the modulated light components from the three light valves and projects the composed light, the projection lens needs to have a large back focal length in order to arrange a prism for color composition as a characteristic of the projection lens. In addition, the spectral characteristics of the color composition optical system vary depending on the angle of incident light. Therefore, the projection lens needs to have characteristics that an entrance pupil is positioned at a sufficiently long distance as viewed from the reduction side. That is, the projection lens needs to have telecentricity. The projection lens also needs to correct aberration according to the resolution of a device.

As the size of the light valve is reduced, the precision thereof is improved, and personal computers are widely spread, the use of the projection display device for presentation is increased. Therefore, there is an increasing demand for a projection display device having a high performance, high brightness, and a small size.

However, as the performance and brightness of the projection lens are increased, the size of the lens is increased, and the size of a moving mechanism for moving a lens group to adjust focus is also increased.

An inner focus type in which only some lenses in a lens group can be moved to easily adjust focus has been known in the field of an imaging lens of a single-lens reflex camera or video camera. However, when this inner focus type is applied to a projection lens without any change, an emission angle is small, and it is difficult to ensure telecentricity.

Therefore, in the projection display device using the inner focus lens, when a color composition prism is used to perform color composition, color unevenness occurs on a screen. Therefore, it is difficult to use the inner focus lens according to the related art as a projection lens of a projector, without changing the structure of the inner focus lens.

Therefore, in order to solve the above-mentioned problems, JP-A-2001-166205 discloses a projection lens and a projector apparatus.

That is, the projection lens disclosed in JP-A-2001-166205 includes a first negative lens group, a second positive lens group, and a third positive lens group arranged in this order from a magnification side, and a lens arranged closest to a reduction side in the first lens group is moved along the optical axis X to adjust focus. In addition, the gap between the first lens group and the second lens group, and the focal length of the entire lens system are set in a predetermined range.

The projection lens having the above-mentioned structure has an appropriate back focal length, telecentricity, a high optical performance capable of reducing distortion and chromatic aberration, a simple inner focus structure, and a small size.

However, in recent years, as device technology is rapidly developed, there is an increasing demand for a chromatic aberration correcting technique corresponding to an increase in the precision of a device. For example, as the number of pixels of a liquid crystal panel using a light valve is increased, the size of one pixel of the liquid crystal panel is reduced to 10 μm or less. In particular, a design capable of significantly reducing lateral chromatic aberration is required.

However, the related art disclosed in JP-A-2001-166205 does not effectively correct lateral chromatic aberration in a wide visible range. Therefore, the related art needs to be improved.

SUMMARY OF THE INVENTION

The invention has been made in order to solve the above-mentioned problems, and an object of the invention is to provide a projection lens that has a simple inner focus structure, an appropriate back focal length, telecentricity, a high optical performance, and a small size and can effectively correct, particularly, lateral chromatic aberration, and a projection display device using the projection lens.

According to an aspect of the invention, a projection lens includes a first lens group having a negative refractive power and a second lens group having a positive refractive power arranged in this order from a magnification side. A lens unit arranged closest to a reduction side in the first lens group is moved along an optical axis to adjust focus, and at least two lenses are made of a material satisfying Conditional expression 1 given below:

$$0.018 < \theta - (-0.00164 \cdot vd + 0.6427) < 0.06 \quad \text{[Conditional expression 1]}$$

(where $\theta = (n_g - n_F)/(n_F - n_C)$, $vd = (n_d - 1)/(n_F - n_C)$, $n_g$ indicates a refractive index with respect to the g-line (wavelength: 435.84 nm), $n_F$ indicates a refractive index with respect to the F-line (wavelength: 486.13 nm), and $n_d$ indicates a refractive index with respect to the d-line (wavelength: 587.56 nm), and $n_C$ indicates a refractive index with respect to the C-line (wavelength: 656.28 nm)).

Here, examples of the term 'lens unit' include a single lens and a cemented lens.

A lens arranged closest to the reduction side in the second lens group may be a cemented lens of a positive lens and a negative lens.

A positive lens arranged closest to the reduction side in the second lens group may satisfy Conditional expression 1.

The projection lens may satisfy Conditional expression 2 given below:

$$-9.0 < f_1/f < -4.0 \quad \text{[Conditional expression 2]}$$

(where $f_1$ indicates the focal length of the first lens group).

The projection lens may satisfy Conditional expression 3 given below:

$$1.5 < f_2/f < 4.0 \quad \text{[Conditional expression 3]}$$

(where f2 indicates the focal length of the second lens group).

In the projection lens according to the above-mentioned aspect, the lens unit arranged closest to the reduction side in the first lens group may be a single positive lens having a convex surface facing the reduction side.

In the projection lens according to the above-mentioned aspect, in the second lens group, a magnification-side lens unit may include a negative meniscus lens having a concave surface facing the reduction side and a positive lens having a convex surface facing the reduction side arranged in this order from the magnification side, the negative meniscus lens of the second lens group may consist of a single lens, and the positive lens may consist of another single lens.

According to another aspect of the invention, a projection display device includes: at least one light source; at least one light valve; at least one illumination optical unit that guides light emitted from the light source to the light valve; and the projection lens according to the above-mentioned aspect. The light valve modulates the light emitted from the light source, and the modulated light is projected onto a screen by the projection lens.

According to the projection lens and the projection display device of the above-mentioned aspects of the invention, the lens arranged closest to the reduction side in the first lens group is moved along the optical axis X to adjust focus, and at least two lenses are made of a material satisfying the following Conditional expression 1 that defines the relationship between distribution θ and the Abbe number vd:

$$0.018 < \theta - (-0.00164 \cdot vd + 0.6427) < 0.06. \quad \text{[Conditional expression 1]}$$

In this way, it is possible to obtain an appropriate back focal length capable of inserting a color composition optical system and telecentricity. Therefore, it is possible to obtain a high optical performance.

Conditional expression 1 defines the range of a material having anomalous dispersion, and two or more lenses made of a material with anomalous dispersion capable of reducing chromatic aberration are provided.

When Conditional expression 1 is satisfied, it is possible to reduce lateral chromatic aberration in a wide visible range, as compared to the related art disclosed in JP-A-2001-166205.

BRIEF DESCRIPTION OF THE DRAWINGS

FIG. 2 is a diagram illustrating the structure of a projection lens according to Example 2 of the invention;

FIG. 3 is a diagram illustrating the structure of a projection lens according to Example 3 of the invention;

FIG. 4 is a diagram illustrating all aberrations of the projection lens according to Example 1, where (A) shows spherical aberration, (B) shows astigmatism, (C) shows distortion, and (D) shows lateral chromatic aberration;

FIG. 5 is a diagram illustrating all aberrations of the projection lens according to Example 2, where (A) shows spherical aberration, (B) shows astigmatism, (C) shows distortion, and (D) shows lateral chromatic aberration;

FIG. 6 is a diagram illustrating all aberrations of the projection lens according to Example 3, where (A) shows spherical aberration, (B) shows astigmatism, (C) shows distortion, and (D) shows lateral chromatic aberration.

DESCRIPTION OF THE PREFERRED EMBODIMENTS

Figure 1:
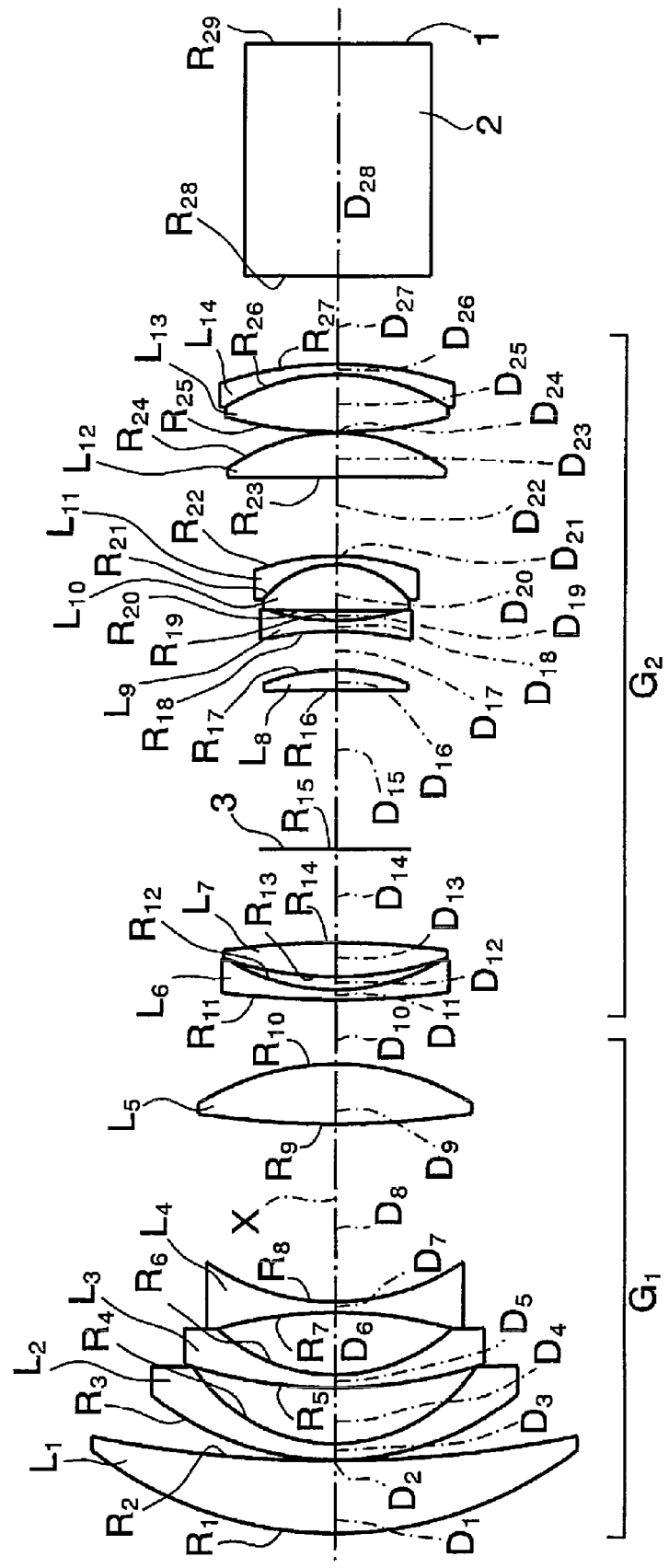
FIG. 1 is a diagram illustrating the structure of a projection lens according to Example 1 of the invention.

Hereinafter, exemplary embodiments of the invention will be described with reference to the accompanying drawings. FIG. 1 is a diagram illustrating a projection lens according to an embodiment of the invention, and shows the structure of a lens according to Example 1, which will be described below. This lens will be described below as a representative example of this embodiment. In FIG. 1, X indicates an optical axis.

The projection lens according to this embodiment is a fixed-focus lens, and includes a first lens group $G_1$ having a negative refractive power and a second lens group $G_2$ having a positive refractive power arranged in this order from a magnification side. In addition, the reduction side of the projection lens is substantially telecentric.

The first lens group $G_1$ includes five lenses, that is, positive, negative, negative, negative, and positive lenses arranged in this order from the magnification side.

The second lens group $G_2$ includes two negative and positive lenses, an aperture diaphragm (or a mask) 3, and seven positive, negative, positive, negative, positive, positive, and negative lenses arranged in this order from the magnification side. That is, the second lens group $G_2$ includes a total of nine lenses.

A mask may be provided at a different position together with the aperture diaphragm (or a mask) 3.

In the projection lens shown in FIG. 1, a light beam that is incident from the right side of FIG. 1 and is given image information from an image display surface 1 of a light valve is incident on the projection lens through a glass block (which includes various filters, such as a low pass filter or an infrared cut filter) 2, and is enlarged and projected to the left side of FIG. 1 by the projection lens. FIG. 1 shows only one image display surface 1 for easy viewing. However, in a projection display device, a color separation optical system separates a light beam emitted from a light source into three primary color light beams, and light valves are provided for the three primary color light beams to display a full color image.

Specifically, a color composition unit (glass block), such as a cross dichroic prism, may be provided at the position of the glass block 2 to compose the three primary color light beams.

It is preferable to move a lens unit (a fifth lens $L_5$ in FIG. 1) arranged closest to the reduction side in the first lens group $G_1$ in the optical axis X direction to adjust focus.

When the lens unit arranged closest to the reduction side in the first lens group $G_1$ is used as a focus group to adjust focus, it is possible to make the total length of the lens system constant.

As shown in FIG. 1, a lens unit arranged closest to the reduction side in the first lens group $G_1$ may be a single positive lens having a convex surface facing the reduction side. In this case, it is possible to reduce a focusing load.

The projection lens according to this embodiment satisfies Conditional expression 1 given below:

$$0.018 < \theta - (-0.00164 \cdot vd + 0.6427) < 0.06 \quad \text{[Conditional expression 1]}$$

(where $\theta = (n_g - n_F)/(n_F - n_C)$, $vd = (n_d - 1)/(n_F - n_C)$, $n_g$ indicates a refractive index with respect to the g-line (wavelength: 435.84 nm), $n_F$ indicates a refractive index with respect to the F-line (wavelength: 486.13 nm), $n_d$ indicates a refractive index with respect to the d-line (wavelength: 587.56 nm, and $n_C$ indicates a refractive index with respect to the C-line (wavelength: 656.28 nm)).

The projection lens according to this embodiment satisfies Conditional expressions 2 and 3 given below:

$-9.0 < f_1/f < -4.0$, and [Conditional expression 2]

$1.5 < f_2/f < 4.0$ [Conditional expression 3]

(where $f_1$ indicates the focal length of the first lens group $G_1$, and $f_2$ indicates the focal length of the second lens group $G_2$).

According to the above-mentioned structure, the projection lens according to this embodiment can have an appropriate back focal length, a high brightness, a high optical performance, and a small size.

Hereinafter, the meaning of Conditional expressions 1 to 3 will be described.

First, Conditional expression 1 defines the range of an anomalous dispersion material (glass material), and defines that the projection lens according to this embodiment includes two or more lenses made of an anomalous dispersion material for reducing chromatic aberration.

That is, if the value is less than the lower limit of Conditional expression 1, the anomalous dispersion of the glass material is reduced. As a result, it is difficult to sufficiently reduce lateral chromatic aberration.

On the other hand, if the value is greater than the upper limit of Conditional expression 1, there is no material satisfying the above-mentioned range. Even if there is a glass material satisfying the above-mentioned range, the glass material is very expensive.

The projection lens disclosed in JP-A-2001-166205 needs to reduce lateral chromatic aberration in, particularly, a short wavelength range (for example, the g-line). However, in this embodiment, the projection lens includes two or more lenses made of a glass material satisfying Conditional expression 1. Therefore, it is possible to effectively correct lateral chromatic aberration in the wide visible range including the g-line.

In addition, the projection lens may satisfy the following Conditional expression 1' instead of Conditional expression 1:

$0.025 < \theta - (-0.00164 \cdot vd + 0.6427) < 0.05$. [Conditional expression 1']

In this case, it is possible to further reduce lateral chromatic aberration.

It is preferable that one of the lenses satisfying Conditional expression 1 be a positive lens arranged closest to the reduction side in the second lens group $G_2$. In this way, it is possible to effectively prevent lateral chromatic aberration.

If the values of $f_1/f$ and $f_2/f$ are greater than the upper limits of Conditional expressions 2 and 3 or less than the lower limits thereof, the power balance between the first lens group $G_1$ and the second lens group $G_2$ is broken, and it is difficult to obtain an appropriate back focal length or correct all aberrations. Therefore, the projection lens is configured so as to satisfy Conditional expressions 2 and 3. In this case, the power balance between the first lens group $G_1$ and the second lens group $G_2$ is maintained, and an appropriate back focal length is obtained. As a result, it is easy to correct all aberrations.

Conditional expression 2 is set so as to be established at all focus positions.

It is preferable that a lens arranged closest to the reduction side in the second lens group $G_2$ be a cemented lens of a positive lens and a negative lens. In this way, it is possible to effectively correct chromatic aberration.

Preferably, a negative meniscus lens having a concave surface facing the reduction side and a positive lens having a convex surface facing the reduction side are arranged in this order from the magnification side in a lens unit (the lens $L_6$ and the lens $L_7$ in FIG. 1) that is arranged closest to the magnification side in the second lens group $G_2$, and the two lenses are preferably composed of a single lens. In this way, it is possible to effectively correct all aberrations, such as astigmatism and comatic aberration.

Figure 7:
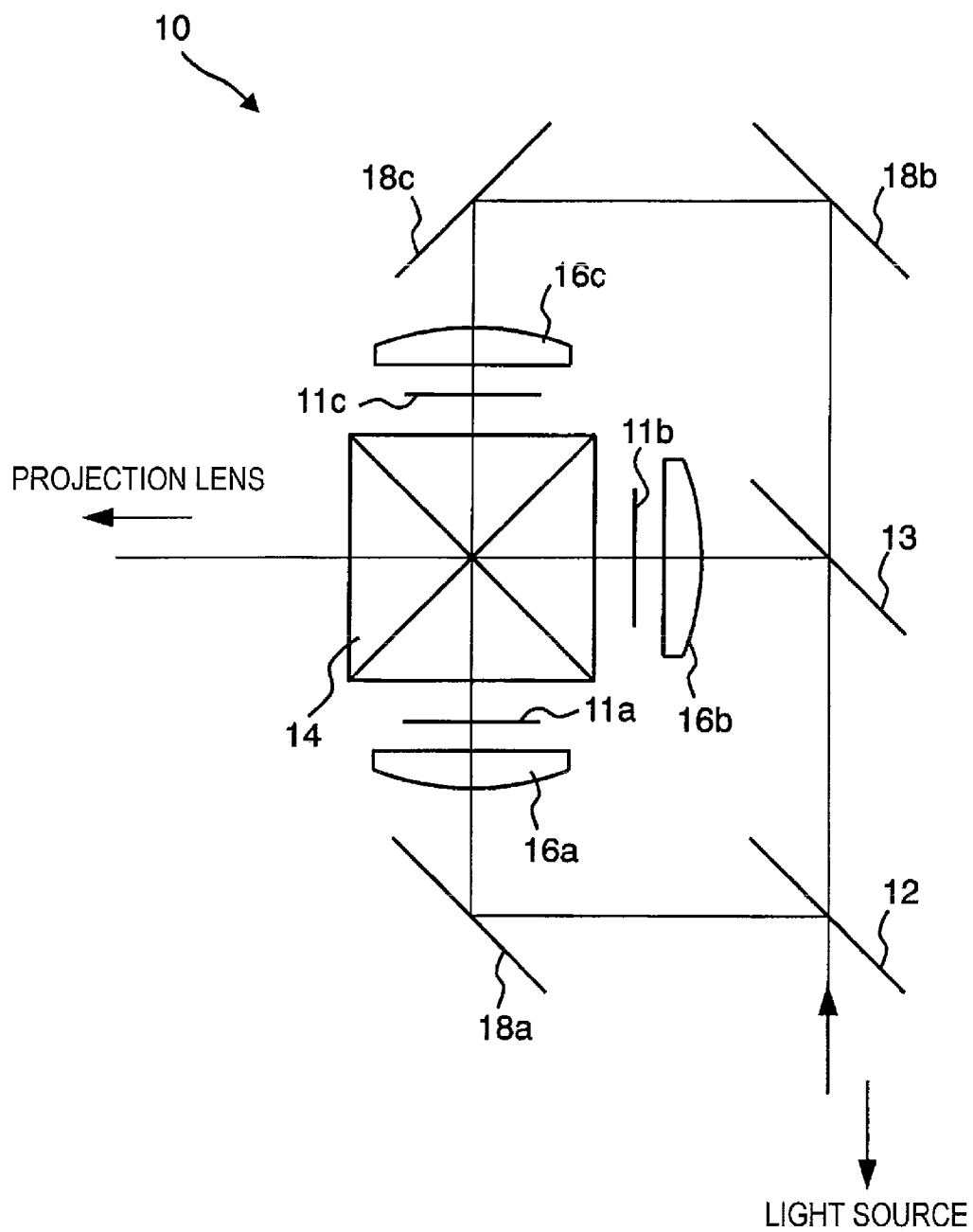
FIG. 7 is a diagram schematically illustrating the structure of a main part of a projection display device according to an embodiment of the invention.

Next, a projection display device according to an embodiment of the invention will be described. FIG. 7 is a diagram illustrating an example of the structure of a main part (illumination optical system 10) of the projection display device according to the embodiment of the invention.

As shown in FIG. 7, the illumination optical system 10 includes transmissive liquid crystal panels 11a to 11c, serving as light valves, dichroic mirrors 12 and 13 for color separation, a cross dichroic prism 14 for color composition, condenser lenses 16a to 16c, and total reflecting mirrors 18a to 18c. The previous stage of the dichroic mirror 12 is not shown in FIG. 1. White light emitted from the light source is incident on the liquid crystal panels 11a to 11c corresponding to three color light beams (G light, B light, and R light) through the illumination optical unit and then modulated. Then, the modulated light beams are projected onto a screen by the projection lens.

Since the projection display device uses the projection lens according the embodiment of the invention, it is possible to effectively correct chromatic aberration and obtain a large high-resolution screen.

Next, detailed examples of the projection lens according to the embodiment of the invention will be described. In the following examples, members having the same operation and effect are denoted by the same reference numerals.

EXAMPLE 1

As shown in FIG. 1, a projection lens according to Example 1 includes a first lens group $G_1$ having a negative refractive power and a second lens group $G_2$ having a positive refractive power arranged in this order from the magnification side, and the reduction side of the projection lens is substantially telecentric.

The first lens group $G_1$ includes five lenses, that is, a first lens $L_1$, which is a positive meniscus lens having a convex surface facing the magnification side, second and third lenses $L_2$ and $L_3$, which are negative meniscus lenses each having a convex surface facing the magnification side, a fourth lens $L_4$, which is a biconcave lens, and a fifth lens $L_5$, which is a biconvex lens, arranged in this order from the magnification side.

The second lens group $G_2$ includes a sixth lens $L_6$, which is a negative meniscus lens having a convex surface facing the magnification side, a seventh lens $L_7$, which is a biconvex lens, an aperture diaphragm (or a mask, which is the same with the following description) 3, an eighth lens $L_8$, which is a positive meniscus lens having a convex surface facing the reduction side, a ninth lens $L_9$, which is a biconcave lens, a cemented lens of a tenth lens $L_{10}$, which is a biconvex lens, and an eleventh lens $L_{11}$, which is a negative meniscus lens having a convex surface facing the reduction side, a twelfth lens $L_{12}$, which is a plano-convex lens having a convex surface facing the reduction side, and a cemented lens of a thirteenth lens $L_{13}$, which is a biconvex lens, and a fourteenth lens $L_{14}$, which is a negative meniscus lens having a convex surface facing the reduction side, arranged in this order from the magnification side. That is, the second lens group $G_2$ includes a total of nine lenses.

The fifth lens $L_5$ arranged closest to the reduction side in the first lens group $G_1$ is moved in the optical axis X direction to adjust focus.

The fifth lens $L_5$ is a single positive spherical lens having a convex surface facing the reduction side, and has a certain degree of power. In this way, it is possible to reduce the weight and the movement distance of a focus group with a simple manner. As a result, it is possible to more effectively use the first lens group as a focus group.

The projection lens according to Example 1 is configured so as to satisfy Conditional expressions 1 to 3 (and Conditional expression 1').

In Example 1, one of the lenses satisfying Conditional expression 1 is a positive lens (thirteenth lens $L_{13}$) closest to the reduction side in the second lens group $G_2$. In this way, it is possible to effectively prevent lateral chromatic aberration. Another lens is the third lens $L_3$. That is, the third lens $L_3$ is made of an anomalous dispersion glass satisfying Conditional expression 1. Therefore, it is possible to correspond to the situation in which, as the height of a light beam from the optical axis is increased, lateral chromatic aberration is more likely to occur. When the first lens $L_1$ or the second lens $L_2$ having a relatively large diameter is made of the anomalous dispersion glass, it is effective to reduce manufacturing costs.

FIG. 1 also shows the image display surface 1 of the light valve, the glass block 2, and the aperture diaphragm 3.

In Table 1, an upper part shows the curvature radius R of each lens surface in the projection lens according to Example 1 (the focal length of the entire lens system is normalized to 1.00, which is similarly applied to the following examples), the thickness of the center of each lens and an air space (hereinafter, referred to as an on-axis surface spacing) D between the lenses (the focal length of the entire lens system is normalized to 1.00, which is similarly applied to the following examples), and the refractive index $N_d$ and the Abbe number $v_d$ of each lens with respect to the d-line. In Table 1 and Tables 2 to 4, which will be described below, a surface number is sequentially increased from the magnification side.

In Table 1, a lower part shows a variable spacing 1 (the gap between the fourth lens $L_4$ and the fifth lens $L_5$) and a variable spacing 2 (the gap between the fifth lens $L_5$ and the sixth lens $L_6$) when a magnification side power is 83.0 and 242.7. The term 'magnification side power' does not mean power that varies when a projection distance is constant, but means power that varies depending on the projection distance in the focusing range.

TABLE 1

| Surface number | R | D | Nd | vd |
|---|---|---|---|---|
| 1 | 3.834 | 0.673 | 1.7130 | 53.9 |
| 2 | 11.954 | 0.009 | | |
| 3 | 2.822 | 0.149 | 1.7130 | 53.9 |
| 4 | 1.630 | 0.517 | | |
| 5 | 4.781 | 0.117 | 1.4970 | 81.5 |
| 6 | 1.704 | 0.567 | | |
| 7 | −4.245 | 0.097 | 1.8467 | 23.8 |
| 8 | 2.207 | Variable spacing 1 | | |
| 9 | 8.895 | 0.554 | 1.5168 | 64.2 |
| 10 | −2.528 | Variable spacing 2 | | |
| 11 | 9.008 | 0.090 | 1.5891 | 61.1 |
| 12 | 1.999 | 0.123 | | |

TABLE 1-continued

| | | | | |
|---|---|---|---|---|
| 13 | 3.420 | 0.316 | 1.6990 | 30.1 |
| 14 (Mask) | −7.991 | 0.864 | | |
| 15 | ∞ | 1.462 | | |
| 16 | −29.214 | 0.183 | 1.6034 | 38.0 |
| 17 | −2.001 | 0.361 | | |
| 18 | −3.385 | 0.099 | 1.5688 | 56.4 |
| 19 | 2.169 | 0.095 | | |
| 20 | 31.403 | 0.426 | 1.5174 | 52.4 |
| 21 | −0.914 | 0.079 | 1.8467 | 23.8 |
| 22 | −2.302 | 0.728 | | |
| 23 | ∞ | 0.404 | 1.4875 | 70.2 |
| 24 | −1.835 | 0.009 | | |
| 25 | 4.148 | 0.532 | 1.4970 | 81.5 |
| 26 | −2.015 | 0.095 | 1.8340 | 37.2 |
| 27 | −3.554 | 0.815 | | |
| 28 | ∞ | 2.134 | 1.5163 | 64.1 |
| 29 | ∞ | | | |

| | Magnification side power | |
|---|---|---|
| | 83.0 times | 242.7 times |
| Variable spacing 1 | 1.641 | 1.628 |
| Variable spacing 2 | 0.589 | 0.602 |

Values corresponding to Conditional expressions 1 to 3 (and Conditional expression 1') in Example 1 are shown in Table 4. As can be seen from Table 4, Example 1 satisfies all of Conditional expressions 1 to 3 (and Conditional expression 1').

EXAMPLE 2

FIG. 2 shows the structure of a projection lens according to Example 2. The projection lens according to Example 2 is similar to that according to Example 1 in that it includes a first lens group $G_1$ having a negative refractive power and a second lens group $G_2$ having a positive refractive power arranged in this order from the magnification side and the reduction side thereof is substantially telecentric, but is different therefrom in the structure of the second lens group G2.

That is, the projection lens according to Example 2 differs from that according to Example 1 in that the second lens group $G_2$ includes a sixth lens $L_6$, which is a negative meniscus lens having a convex surface facing the magnification side, a seventh lens $L_7$, which is a biconvex lens, an aperture diaphragm (or a mask, which is similarly applied to the following description) 3, an eighth lens $L_8$, which is a positive meniscus lens having a convex surface facing the reduction side, a cemented lens of a ninth lens $L_9$, which is a biconcave lens, and a tenth lens $L_{10}$, which is a biconvex lens, an eleventh lens $L_{11}$, which is a negative meniscus lens having a convex surface facing the reduction side, a twelfth lens $L_{12}$, which is a positive meniscus lens having a convex surface facing the reduction side, and a cemented lens of a thirteenth lens $L_{13}$, which is a biconvex lens, and a fourteenth lens $L_{14}$, which is a negative meniscus lens having a convex surface facing the reduction side, arranged in this order from the magnification side.

The projection lens according to Example 2 is similar to that according to Example 1 in the lens structure of the first lens group $G_1$ and in that the fifth lens $L_5$ is moved in the optical axis direction to adjust focus.

In addition, the projection lens according to Example 2 is similar to that according to Example 1 in that the lenses satisfying Conditional expression 1 include the third lens $L_3$ and the thirteenth lens $L_{13}$.

In Table 2, an upper part shows the curvature radius R of each lens surface in the projection lens according to Example 2, the on-axis surface spacing D between the lenses, and the refractive index $N_d$ and the Abbe number $v_d$ of each lens with respect to the d-line. In Table 2, a lower part shows the variable spacing 1 (the gap between the fourth lens $L_4$ and the fifth lens $L_5$) and the variable spacing 2 (the gap between the fifth lens $L_5$ and the sixth lens $L_6$) when a magnification side power is 83.0 and 242.7.

TABLE 2

| Surface number | R | D | Nd | vd |
|---|---|---|---|---|
| 1 | 3.582 | 0.637 | 1.8040 | 46.6 |
| 2 | 8.708 | 0.009 | | |
| 3 | 2.722 | 0.149 | 1.7725 | 49.6 |
| 4 | 1.641 | 0.558 | | |
| 5 | 6.040 | 0.117 | 1.4970 | 81.5 |
| 6 | 1.604 | 0.556 | | |
| 7 | −5.142 | 0.090 | 1.8467 | 23.8 |
| 8 | 2.145 | Variable spacing 1 | | |
| 9 | 5.471 | 0.546 | 1.5182 | 58.9 |
| 10 | −2.585 | Variable spacing 2 | | |
| 11 | 11.102 | 0.090 | 1.6584 | 50.9 |
| 12 | 2.030 | 0.411 | | |
| 13 | 6.232 | 0.271 | 1.7618 | 26.5 |
| 14 (Mask) | −6.161 | 1.043 | | |
| 15 | ∞ | 1.014 | | |
| 16 | −15.085 | 0.182 | 1.4875 | 70.2 |
| 17 | −2.298 | 1.465 | | |
| 18 | −4.075 | 0.099 | 1.7995 | 42.2 |
| 19 | 1.989 | 0.466 | 1.4875 | 70.2 |
| 20 | −1.558 | 0.079 | | |
| 21 | −1.188 | 0.106 | 1.7618 | 26.5 |
| 22 | −2.117 | 0.235 | | |
| 23 | −70.964 | 0.412 | 1.5891 | 61.1 |
| 24 | −1.799 | 0.009 | | |
| 25 | 3.877 | 0.550 | 1.4970 | 81.5 |
| 26 | −1.993 | 0.095 | 1.8040 | 46.6 |
| 27 | −3.924 | 0.817 | | |
| 28 | ∞ | 2.135 | 1.5163 | 64.1 |
| 29 | ∞ | | | |

| | Magnification side power | |
|---|---|---|
| | 83.0 times | 242.7 times |
| Variable spacing 1 | 1.360 | 1.347 |
| Variable spacing 2 | 0.236 | 0.248 |

Values corresponding to Conditional expressions 1 to 3 (and Conditional expression 1') in Example 2 are shown in Table 4. As can be seen from Table 4, Example 2 satisfies all of Conditional expressions 1 to 3 (and Conditional expression 1').

EXAMPLE 3

FIG. 3 shows the structure of a projection lens according to Example 3. The projection lens according to Example 3 is similar to that according to Example 1 in that it includes a first lens group $G_1$ having a negative refractive power and a second lens group $G_2$ having a positive refractive power arranged in this order from the magnification side and the reduction side thereof is substantially telecentric, but is different therefrom in the structure of the second lens group G2.

That is, the projection lens according to Example 3 differs from that according to Example 1 in that the second lens group $G_2$ includes a sixth lens $L_6$, which is a negative meniscus lens having a convex surface facing the magnification side, a seventh lens $L_7$, which is a biconvex lens, an aperture diaphragm (or a mask, which is the same with the following description) 3, an eighth lens $L_8$, which is a positive meniscus lens having a convex surface facing the reduction side, a cemented lens of a ninth lens $L_9$, which is a biconcave lens, a tenth lens $L_{10}$, which is a biconvex lens, and an eleventh lens $L_{11}$, which is a negative meniscus lens having a convex surface facing the reduction side, a twelfth lens $L_{12}$, which is a biconvex lens, and a cemented lens of a thirteenth lens $L_{13}$, which is a biconvex lens, and a fourteenth lens $L_{14}$, which is a negative meniscus lens having a convex surface facing the reduction side, arranged in this order from the magnification side.

In addition, the projection lens according to Example 3 is substantially similar to that according to Example 1 in the lens structure of the first lens group $G_1$ and the second lens group $G_2$ and in that the fifth lens $L_5$ is moved in the optical axis direction to adjust focus.

Similar to Examples 1 and 2, in Example 3, one of the lenses satisfying Conditional expression 1 is a positive lens (thirteenth lens $L_{13}$) closest to the reduction side in the second lens group $G_2$. In this way, it is possible to effectively prevent lateral chromatic aberration. Another lens is the tenth lens L10 of the cemented lens composed of three lenses. That is, the tenth lens L10 is made of an anomalous dispersion glass satisfying Conditional expression 1. Therefore, it is possible to effectively correct longitudinal chromatic aberration as well as lateral chromatic aberration.

In Table 3, an upper part shows the curvature radius R of each lens surface in the projection lens according to Example 3, the on-axis surface spacing D between the lenses, and the refractive index $N_d$ and the Abbe number $v_d$ of each lens with respect to the d-line. In Table 3, a lower part shows the variable spacing 1 (the gap between the fourth lens $L_4$ and the fifth lens $L_5$) and the variable spacing 2 (the gap between the fifth lens $L_5$ and the sixth lens $L_6$) when a magnification side power is 83.0 and 242.7.

TABLE 3

| Surface number | R | D | Nd | vd |
|---|---|---|---|---|
| 1 | 3.491 | 0.676 | 1.8040 | 46.6 |
| 2 | 8.334 | 0.074 | | |
| 3 | 2.510 | 0.200 | 1.8040 | 46.6 |
| 4 | 1.551 | 0.488 | | |
| 5 | 4.446 | 0.158 | 1.7725 | 49.6 |
| 6 | 1.632 | 0.502 | | |
| 7 | −4.947 | 0.091 | 1.8467 | 23.8 |
| 8 | 2.035 | Variable spacing 1 | | |
| 9 | 5.081 | 0.536 | 1.5174 | 52.4 |
| 10 | −2.361 | Variable spacing 2 | | |
| 11 | 8.122 | 0.090 | 1.6779 | 55.3 |
| 12 | 1.894 | 0.152 | | |
| 13 | 6.901 | 0.215 | 1.8052 | 25.4 |
| 14 (Mask) | −6.797 | 0.671 | | |
| 15 | ∞ | 1.208 | | |
| 16 | −4.862 | 0.167 | 1.5174 | 52.4 |
| 17 | −1.961 | 1.946 | | |
| 18 | −9.116 | 0.063 | 1.8010 | 35.0 |
| 19 | 2.136 | 0.623 | 1.4970 | 81.5 |
| 20 | −1.503 | 0.077 | 1.7995 | 42.2 |
| 21 | −3.284 | 0.032 | | |
| 22 | 5.835 | 0.464 | 1.5891 | 61.1 |
| 23 | −2.580 | 0.009 | | |
| 24 | 3.275 | 0.533 | 1.4970 | 81.5 |
| 25 | −2.882 | 0.095 | 1.8040 | 46.6 |
| 26 | −9.915 | 0.816 | | |

TABLE 3-continued

| 27 | ∞ | 2.132 | 1.5163 | 64.1 |
| 28 | ∞ | | | |

| | Magnification side power | |
| --- | --- | --- |
| | 83.0 times | 242.7 times |
| Variable spacing 1 | 1.109 | 1.098 |
| Variable spacing 2 | 0.591 | 0.603 |

Values corresponding to Conditional expressions 1 to 3 (and Conditional expression 1') in Example 3 are shown in Table 4. As can be seen from Table 4, Example 3 satisfies all of Conditional expressions 1 to 3 (and Conditional expression 1').

FIGS. 4 to 6 are diagrams illustrating all aberrations (spherical aberration, astigmatism, distortion, and lateral chromatic aberration) of the projection lenses according to Examples 1 to 3. In the aberration diagrams, ω indicates a half angle of view. The spherical aberration diagram shows the aberration curves of the d-line, the F-line, and the C-line. The lateral chromatic aberration diagram shows the aberration curves of the F-line (represented by a dotted line, which is the same with the other lateral chromatic aberration diagrams) and the C-line (represented by a two-dot chain line, which is the same with the other lateral chromatic aberration diagrams) with respect to the d-line. As shown in FIGS. 4 to 6, in the projection lenses according to Examples 1 to 3, all aberrations including distortion and lateral chromatic aberration are effectively corrected, and the projection lenses have an F number of 2.20, which is a large value, and a total angle of view 2ω of 69.6 degrees, which is a wide angle.

The projection lens according to the invention is not limited to the above-described examples, but various modifications and changes of the invention can be made. For example, the curvature radius R of each lens and the on-axis surface spacing D between the lenses may be appropriately changed.

In addition, the projection display device according to the invention is not limited to the above-mentioned structure, but the projection lens according to the invention may be applied to various apparatuses. For example, a transmissive or reflective liquid crystal display device or a micro mirror device having a plurality of tiltable micro mirrors formed on a substantial plane (for example, a digital micro mirror device available from Texas Instruments, Inc.) may be used as the light valve. In addition, the structure of the illumination optical system may be appropriately changed depending on the kind of light valves.

TABLE 4

| | (1)Dispersion formula | (2)$f_1/f$ | (3)$f_2/f$ |
| --- | --- | --- | --- |
| Example 1 | 0.029 | −7.60 | 2.98 |
| | for third lens $L_3$ and thirteenth lens $L_{13}$ | | |
| Example 2 | 0.029 | −7.85 | 2.66 |
| | for third lens $L_3$ and thirteenth lens $L_{13}$ | | |
| Example 3 | 0.029 | −5.74 | 2.64 |
| | for third lens $L_{10}$ and thirteenth lens $L_{13}$ | | |

What is claimed is:

1. A projection lens comprising:
a first lens group having a negative refractive power; and
a second lens group having a positive refractive power,
wherein the first and second lens groups are arranged in this order from a magnification side,
a lens unit arranged closest to a reduction side in the first lens group is moved along an optical axis to adjust focus, and
at least two lenses are made of a material satisfying the following conditional expression:

$$0.018 < \theta - (-0.00164 \cdot vd + 0.6427) < 0.06 \quad (1)$$

where $\theta = (n_g - n_F)/(n_F - n_C)$, $vd = (n_d - 1)/(n_F - n_C)$, $n_g$ indicates a refractive index with respect to the g-line of 435.84 nm in wavelength, $n_F$ indicates a refractive index with respect to the F-line of 486.13 nm in wavelength, $n_d$ indicates a refractive index with respect to the d-line of 587.56 nm in wavelength, and $n_C$ indicates a refractive index with respect to the C-line of 656.28 nm in wavelength, wherein
in the second lens group, a magnification-side lens unit includes a negative meniscus lens having a concave surface facing the reduction side and a positive lens having a convex surface facing the reduction side arranged in this order from the magnification side,
the negative meniscus lens of the second lens group consists of a single lens, and
the positive lens of the second lens group consists of another single lens.

2. The projection lens according to claim 1,
wherein a lens arranged closest to the reduction side in the second lens group is a cemented lens of a positive lens and a negative lens.

3. The projection lens according to claim 1,
wherein a positive lens arranged closest to the reduction side in the second lens group satisfies the expression (1).

4. The projection lens according to claim 1,
wherein the projection lens satisfies the following conditional expression:

$$-9.0 < f_1/f < -4.0$$

where $f_1$ indicates the focal length of the first lens group and f indicates the focal length of the projection lens.

5. The projection lens according to claim 1,
wherein the projection lens satisfies the following conditional expression:

$$1.5 < f_2/f < 4.0$$

where f2 indicates the focal length of the second lens group and f indicates the focal length of the projection lens.

6. The projection lens according to claim 1,
wherein the lens unit arranged closest to the reduction side in the first lens group is a single positive lens having a convex surface facing the reduction side.

7. A projection display device comprising:
at least one light source;
at least one light valve;
at least one illumination optical unit that guides light emitted from the light source to the light valve; and
the projection lens according to claim 1,
wherein the light valve modulates the light emitted from the light source, and
the modulated light is projected onto a screen by the projection lens.

* * * * *